United States Patent [19]

Murayama

[11] Patent Number: 5,007,011
[45] Date of Patent: Apr. 9, 1991

[54] DATA STORAGE DEVICE INCLUDING DATA ADDRESS PREDICTING FUNCTION

[75] Inventor: Noboru Murayama, Tokyo, Japan

[73] Assignee: Ricoh Company, Ltd., Japan

[21] Appl. No.: 892,869

[22] Filed: Aug. 4, 1986

[30] Foreign Application Priority Data

Aug. 10, 1985 [JP] Japan .............................. 60-176100

[51] Int. Cl.$^5$ .............................................. G06F 1/00
[52] U.S. Cl. .................................. 364/900; 364/948; 364/960.3
[58] Field of Search ... 364/200 MS File, 900 MS File; 358/93

[56] References Cited

U.S. PATENT DOCUMENTS

| | | | |
|---|---|---|---|
| 3,928,857 | 12/1975 | Carter et al. | 364/200 |
| 4,064,528 | 12/1977 | Bowerman | 358/93 X |
| 4,086,629 | 4/1978 | Desyllas et al. | 364/200 |
| 4,159,517 | 6/1979 | Paradine et al. | 364/200 |
| 4,371,924 | 2/1983 | Schaefer et al. | 364/200 |

Primary Examiner—Gary V. Harkcom
Assistant Examiner—Mark K. Zimmerman
Attorney, Agent, or Firm—Mason, Fenwick & Lawrence

[57] ABSTRACT

A storage device which realizes fast access for data readout by use of a memory unit whose access time is relatively long. The device predicts a future address to be designated referencing a tendency of variation of addresses which were designated in the past. While the memory unit is not accessed from the outside such as from a central processing unit, data stored in a predicted address is read out to be stored in a register. When a memory read command has arrived from the outside and if the predicted address coincides with a designated address, data in the predicted address is read out of the register which stores the data and delivered to an external data line.

9 Claims, 9 Drawing Sheets

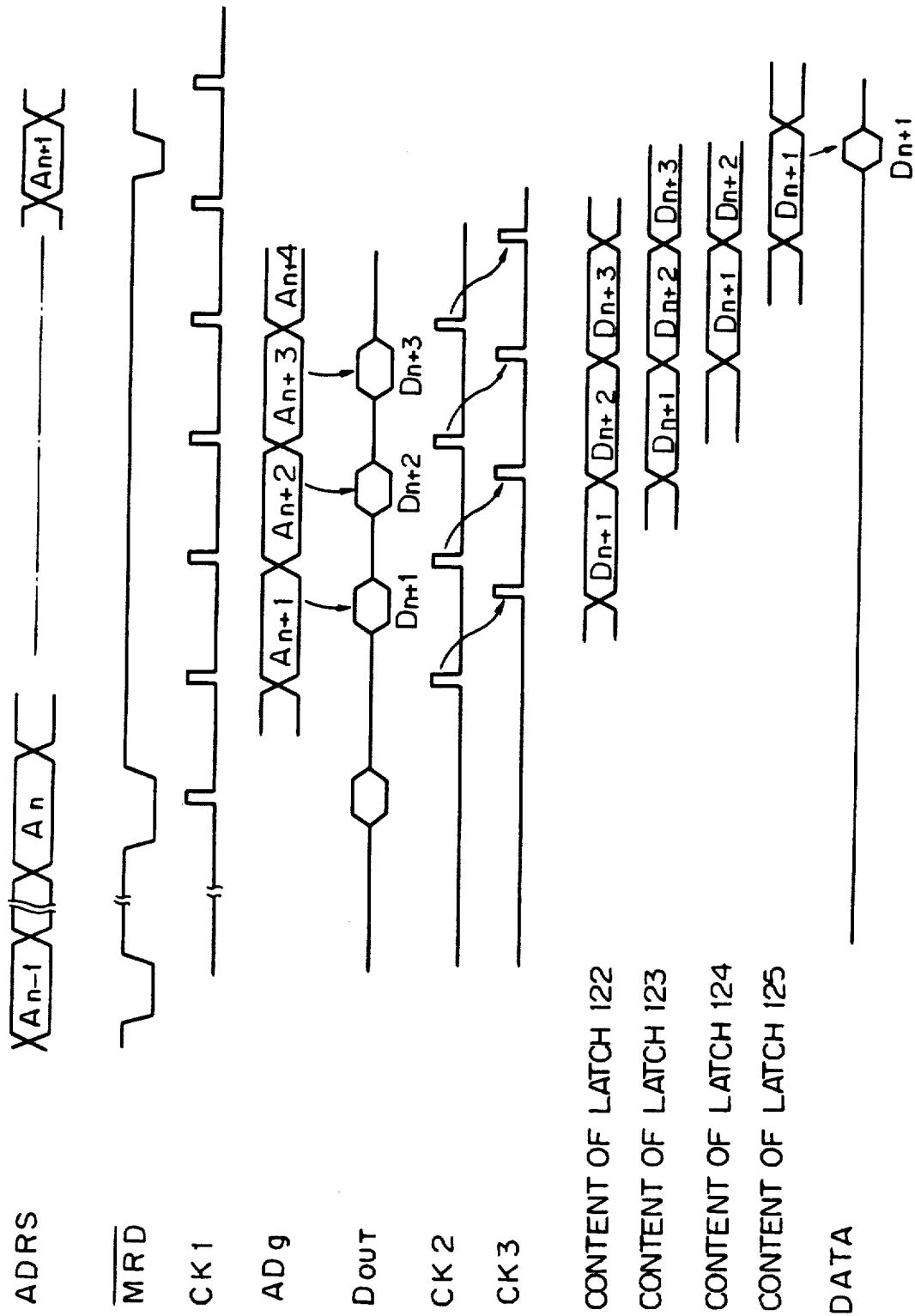

DATA STORAGE DEVICE INCLUDING DATA ADDRESS PREDICTING FUNCTION

BACKGROUND OF THE INVENTION

The present invention relates to a storage device and, more particularly, to a storage device which realizes fast access for data readout by use of a memory unit whose access time is relatively long.

A period of time necessary for data to be actually read or written after the start of a memory read or a memory write control is generally referred to as an access time. As regards modern semiconductor storages such as random access memories (RAMs), the average access time is approximately 200 nanoseconds. In a computer, programs and data are sequentially read out of a storage to perform operations based on the programs and data and, hence, the data processing rate is significantly effected by the memory access time. In light of this, a computer intended for fast processing uses a special storage whose access time is short. However, this type of high-speed storages are extremely expensive.

SUMMARY OF THE INVENTION

It is therefore an object of the present invention to provide a storage device which realizes fast access by use of a memory unit whose access time is relatively long.

It is another object of the present invention to provide a generally improved storage device.

A storage device of the present invention includes an address designating terminal, a data terminal, a memory unit having an area for storing data in each of a plurality of addresses, and a plurality of registers for temporarily holding data which are read out of the memory unit. An address predicting circuit predicts and generates, based on a tendency of variation of signals which appeared on the address designating terminal in the past, an address signal to appear next. A pre-read control circuit, during the absence of a memory access command, sequentially or simultaneously designates addresses which are predicted by the address predicting circuit so as to access the memory unit and stores data read out of the memory unit in the registers. A data read controller, during the presence of a memory read command, references a signal which appears on the address designating terminal so as to see if the signal coincides with any of the addresses of the data which are stored in the registers and, if the signal coincides with any of the addresses, delivers to the data terminal, data which is stored in one of the registers that holds the data of the address and, if the signal does not coincide with the addresses, accesses the memory unit to deliver data read therefrom to the data terminal.

As regards a microprocessor, it has been customary to execute one machine cycle by sequentially performing command read processing, command analyze processing and command execute processing. Hence, the proportion of a period of time during which a storage is not accessed to the period of time during which it is actually accessed is very large. It follows that when the storage is not accessed, it is possible for the storage to read out data within itself independently of a central processing unit.

Meanwhile, program data consist of various command data which are sequentially arranged. This means that the variation of an address which is designated to read out a program is continuous except for a condition wherein the microprocessor executes some special commands such as a jump command and a subroutine command. Therefore, assuming that the microprocessor does not perform any memory readout operation but a program fetching, the address designated for memory readout is updated by each predetermined amount such as n, n+1, n+2, n+3 and so forth. Although memory readout operations in practice include reading data out of data areas allocated in programs and reading data out of stacks, the data in most cases are repeatedly read out by updating designated addresses by each predetermined value. The likely occurrence that the designated address does not regularly change during memory readout is less than 10 percent.

Hence, assuming that the designated address for memory readout is regularly changed, it is possible for a future address or designated to be predicted based on addresses which were designated in the past. If data in a memory is read out of an address which is predicted within a storage device and storage in a register capable of fast readout (e.g. latch) utilizing a period of time during which the memory is not accessed from the outside, the data in the register may be read out in response to an externally derived memory access to remarkably shorten the access time for data readout of the whole storage device as viewed from a central processing unit side. What is required in the event when the prediction proves wrong is simply causing the memory to be accessed directly as in a prior art device. As previously stated, however, the probability of a wrong prediction is less than 10 percent so that in accordance with the present invention an access time of 50 to 55 nanoseconds can be implemented with a memory whose access time is 200 nanoseconds, for example.

The above and other objects, features and advantages of the present invention will become more apparent from the following detailed description taken with the accompanying drawings.

BRIEF DESCRIPTION OF THE DRAWINGS

FIGS. 3, 4A and 4B are timing charts representative of specific examples of signals which appear in various portions of the device of FIG. 1.

DESCRIPTION OF THE PREFERRED EMBODIMENT

Figure 1:
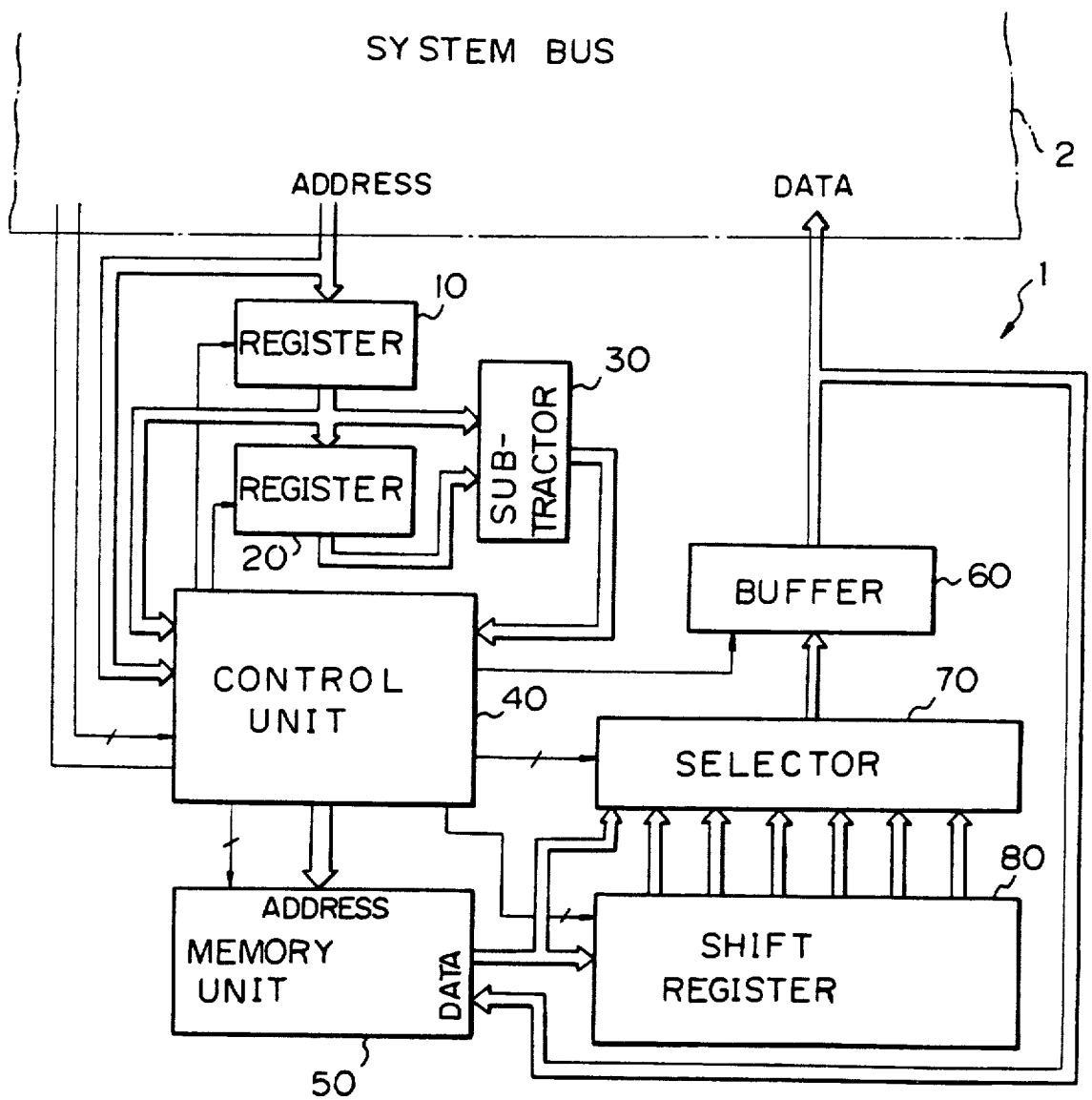
FIG. 1 is a schematic block diagram showing a storage device in accordance with the present invention.

Referring to FIG. 1 of the drawings, a storage device embodying the present invention is shown and generally designated by the reference numeral 1. As shown, the storage device 1 generally comprises registers 10 and 20, a subtractor 30, a control unit 40, a memory unit 50, a buffer 60, a selector 70, and a shift register 80. The device 1 is interconnected to a system bus 2 of a computer.

The register 10 serves to hold address information which is inputted over the system bus 2, at a data read timing. The other register 20 is adapted to hold information which is outputted by the register 10, at a data read timing. Hence, assuming two consecutive times of data readout, the value of the first data read address is stored in the register 20 via the register 10 while that of the second data read address is stored in the register 10. That is, a difference between the values stored in the registers 10 and 20 is equal to a difference between the first and second designated addresses, i.e. amount of updating. The amount of updating appears on an output of the subtractor 30.

The control unit 40 predicts an address to be designated in the future from the amount of updating as outputted by the subtractor 30 and the current address, which is an output of the register 10. Then, when a memory access command is absent on the system bus 2, the control unit 40 accesses the memory unit 50 and loads the shift register 80 with data read out of the unit 50. If an access from the system bus side is absent, the control unit 40 predicts another address to be designated next, then accesses the memory unit 50, and then stores data read out of the unit 50 in the shift register 80. Such a procedure is repeated to store a number of predicted data in the shift register 80. When a memory read command has come in through the system bus 2, the control unit 40 determines whether or not an address designated then coincides with a predicted address or any one of predicted addresses and, if it does, generates a selection signal which is associated with a position of the data, which has been read from that address, inside the shift register 80. The selection signal is applied to the selector 70 and buffer 60 so that the desired data is fed to a data line of the system bus 2 via the selector 70 and buffer 60.

Referring to FIGS. 2A to 2E, a specific construction of the storage device 1 is shown. In the drawings, symbols with overlines imply that signals which they designate are low active, although the discrimination is omitted in the instant specification.

Figure 2A:
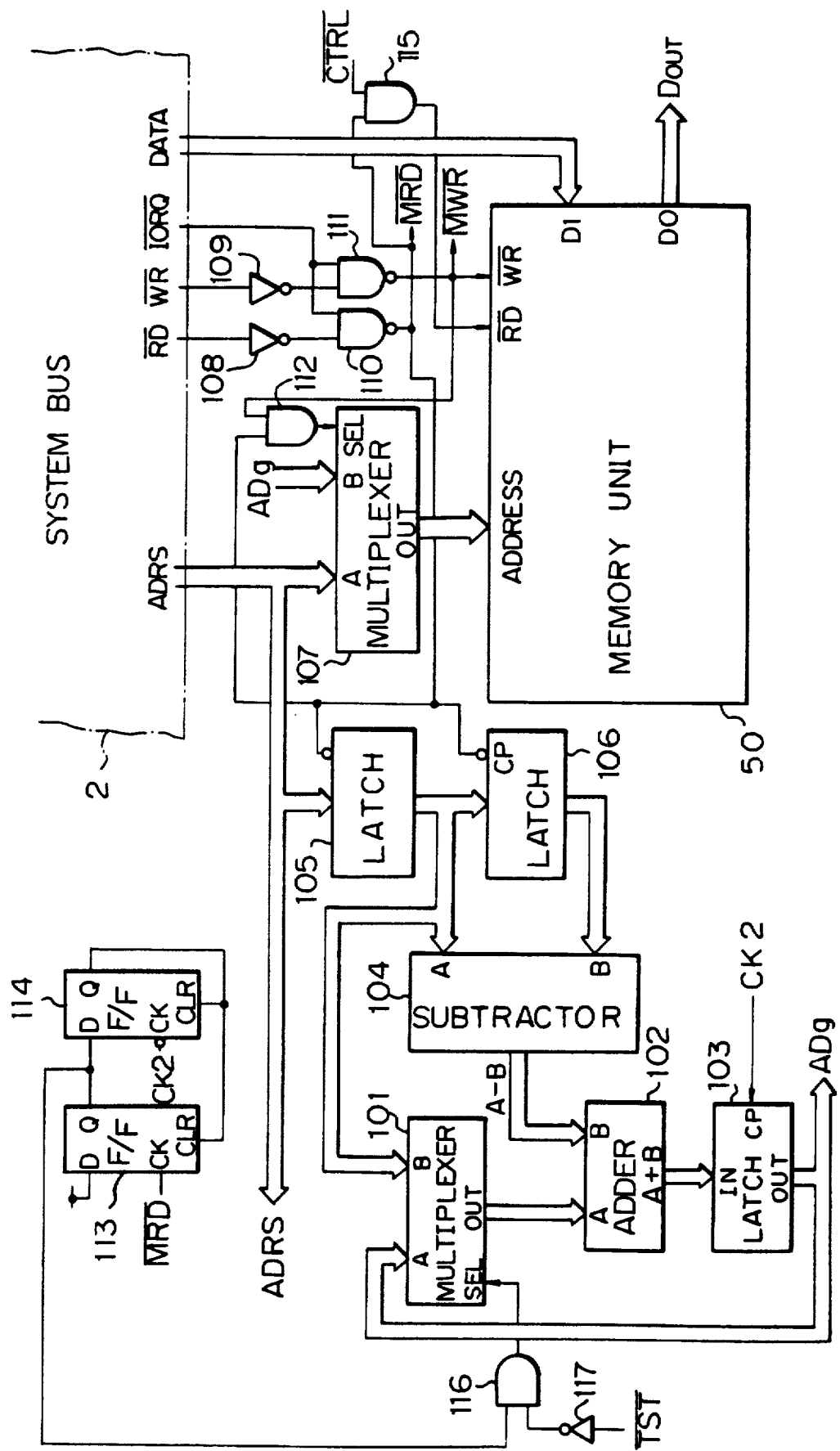
FIGS. 2A to 2E are block diagrams showing a specific construction of the device of FIG. 1.

In FIG. 2A, latches 105 and 106 and a subtractor 104 respectively correspond to the registers 10 and 20 and the subtractor 30 as shown in FIG. 1. A data input terminal of the latch 105 is interconnected to an address terminal ADRS of the system bus 2, and a data input terminal of the latch 106 to an output terminal of the latch 105. Applied to latch control terminals CP of the latches 105 and 106 are a memory read signal MRD which is AND of a read strobe RD and an IO request signal IORQ coming in over the system bus 2. In this construction, when a central processing unit, not shown, interconnected to the system bus 2 reads data out of the storage, address information on the system bus 2 is held by the latch 105 while data stored in the latch 105 is held by the latch 106. It follows that assuming that the data held by the latch 105 is the address information for the "n" data readout, then the data held by the latch 106 is the address information for the "n−1" data readout.

Output data of the latchs 105 and 106 are fed to input terminals A and B of the subtractor 104, respectively. Appearing on an output terminal A−B of the subtractor 104 is a difference between the output data o the latches 105 and 106, i.e. the latest value of amount of updating ΔAD of designated address in a data read control which is executed through the system bus 2. A multiplexer 101, an adder 102 and a latch 103 constitute a circuit for generating a predicted address. At first, the multiplexer 101 produces on an output terminal OUT thereof data which is applied to an input terminal B, i.e. address information ADo used for the previous data readout. The adder 102 produces a value of ADo+ΔAD which is the predicted address to be designated next. In detail, while the microprocessor interconnected to the system bus 2 repetitively and sequentially reads data out of consecutive addresses, the amount of updating is +1 so that the address sequentially changes in the order of n−1, n, n+1, n+2 and so forth. Immediately after data in the address n has been read, n is set in the latch 105 and n−1 in the latch 106 and, therefore, ADo is n and ΔAD is 1. Therefore, the predicted address ADg is n+1 which is equal to an address to be read next.

The multiplexer 101 has a selection control terminal SEL to which a signal generated by flip-flops 113 and 114 is applied. While an output terminal Q of the flip-flop 113 usually remains low in level, it goes high when a memory read operation is completed, i.e., at a positive-going edge of the memory read strobe MRD. As regards the flip-flop 114, on the other hand, its output terminal Q usually remains low and, upon entry of a clock pulse CK2 after a turn of the output terminal Q of the flip-flop 113 from low to high, goes high. As the output terminal Q of the flip-flop 114 becomes high, clear control terminals CLR of the flip-flops 113 and 114 go high so that the flip-flops 113 and 114 become cleared.

In the above condition, the selection control terminal SEL of the multiplexer 101 remains high only for a short period of time immediately after the memory read operation. However, when a signal TST is high, the terminal SEL remains low. The multiplexer 101 passes a signal on the input terminal B to an output terminal OUT when the terminal SEL is high and the signal on the input terminal B to the output terminal OUT when the terminal SEL is low. While the multiplexer 101 selects the input terminal B, a sum of an address designated immediately before and an amount of updating ΔAD, i.e., a predicted address to follow is generated and held by the latch 103 timed to the clock pulse CK2. At the negative-going edge of the clock pulse CK2, the multiplexer 101 comes to select the input terminal A. Then, the next clock pulse CK2 causes the second predicted address (ADo+2ΔAD) to appear on the output of the adder 102, the second estimated address being held by the latch 103. In this manner, every time a clock pulse CK2 appears, a new predicted address is generated.

A multiplexer 107 has an output terminal OUT which is interconnected to an address designation terminal of the memory unit 50. Applied to input terminals A and B of the multiplexer 107 are a current address ADRS and a predicted address ADg, respectively. Applied to a selection control terminal SEL of the multiplexer 107 is OR of the memory read strobe MRD and a memory write strobe MWR. In this construction, while a memory access command is present on the system bus 2, the multiplexer 107 applies a designated address on the system bus 2 to the address terminal of the memory unit 50; while the system bus 2 does not request an access, the multiplexer 107 applies a oredicted address ADg outputted by the latch 103 to the address terminal of the memory unit 50.

The IO request signal IORQ which may come in through the system bus 2 selects the storage when it is high and an input/output (IO) device when it is low. Hence, the memory read strobe MRD and memory write strobe MWR become active when the signal IORQ is high.

Figure 2B:
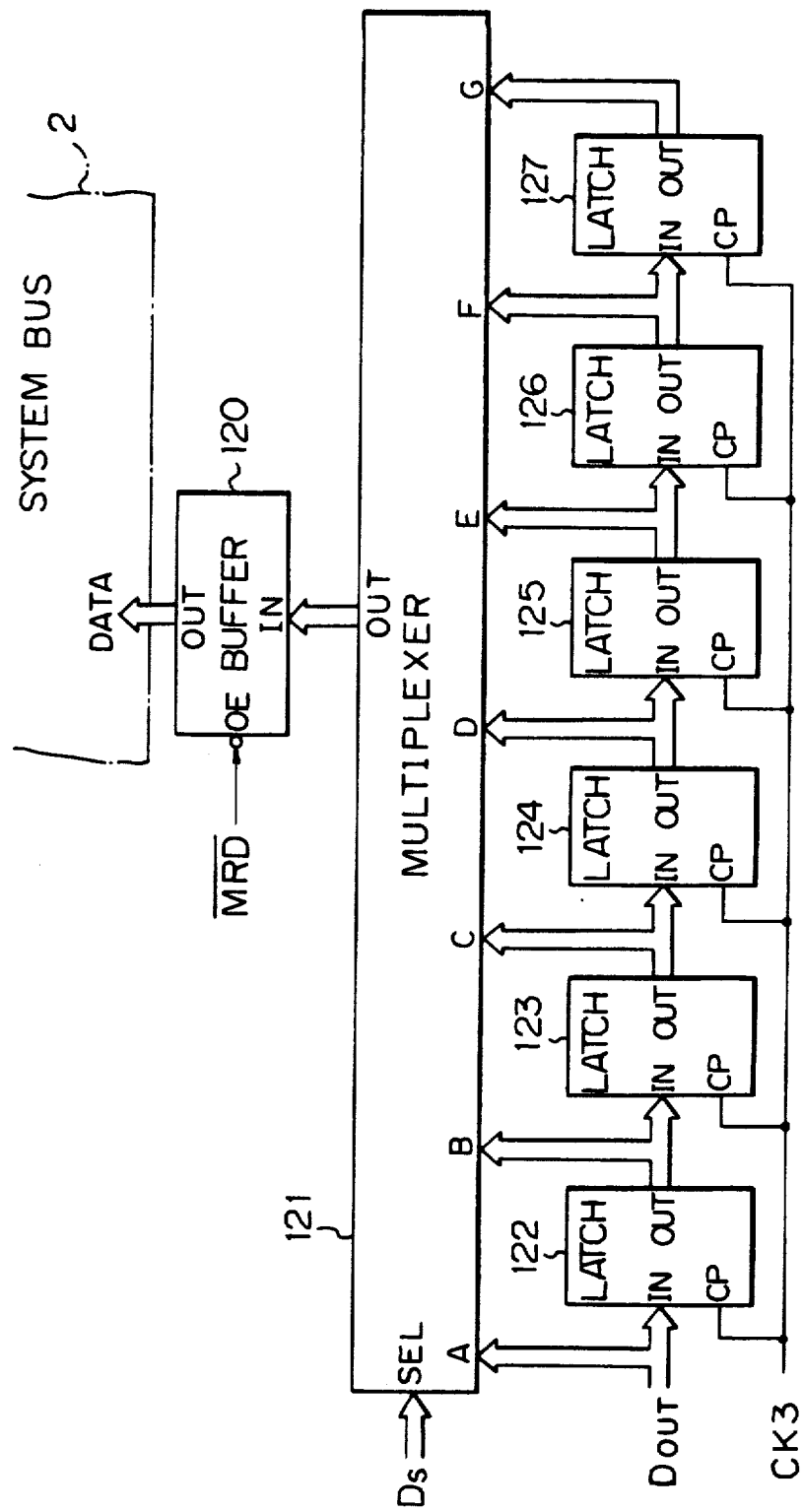

Data Dout appearing on a data output terminal DO of the memory unit 50 is routed to an input terminal of a multiplexer 121 and that of a latch 122, as shown in FIG. 2B. Latches 123, 124, 125, 126 and 127 are serially interconnected to an output terminal OUT of the latch 122. The latches 122 to 127, therefore, constitutes a six-stage shift register which corresponds to the shift register 80 of FIG. 1. The six-stage shift register latches data Dout and shifts data stored thereinside when a clock pulse CK3 is applied thereto. The output terminals OUT of the latches 122 to 127 are respectively interconnected to input terminals A, B, C, D, E, F and G of the multiplexer 121. The multiplexer 121 constitutes the selector 70 of FIG. 1. The output terminal OUT of the multiplexer 121 is interconnected to a data line DATA of the system bus 2 via a buffer 120 which has a thee-state output. The buffer 120 has an output enable control terminal OE to which the memory read strobe MRD is applied.

Figure 2C:
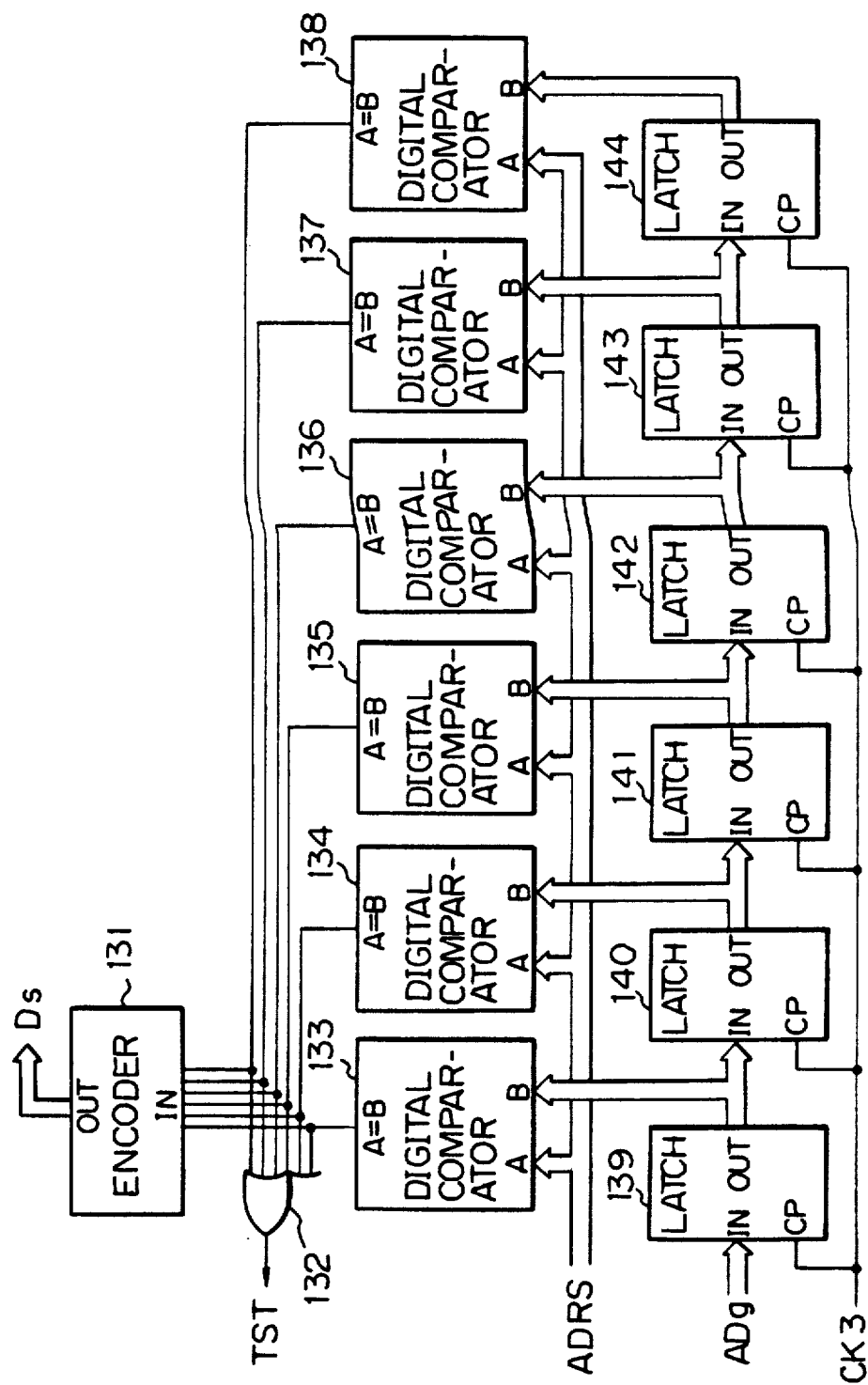

FIG. 2C shows a circuit for comparing a predicted address ADg and a designated address ADRS. The predicted address ADg is applied to an input terminal IN of a latch 139. Serially interconnected to an output terminal OUT of the latch 139 are latches 140, 141, 142, 143 and 144. The latches 139 to 144 in this arrangement constitute a six-stage shift register. This shift register, like the one shown in FIG. 2B (122 to 127), latches the predicted address ADg and shifts data already stored therein when a clock pulse CK3 is applied thereto. Therefore, the latches 139 to 144 respectively hold memory addresses (predicted addresses) which correspond to data latched in the latches 122 to 127.

Output terminals OUT of the latches 139 to 144 are respectively interconnected to input terminals B of digital comparators 133, 134, 135, 136, 137 and 138. Fed to input terminals A of the digital comparators 133 to 138 are designated addresses ADRS. An output terminal A=B of each of the digital comparators 133 to 138 goes high when the values on the input terminals A and B coincide and goes low when otherwise. Specifically, if a designated address ADRS coincides with a single predicted address or any one of a plurality of addresses (not greater than six) predicted before, one of the digital comparators 133 to 138 associated with that particular predicted address produces a high-level output. If all the predictions are wrong, the output terminals of all the digital comparators 133 to 138 go low.

The output terminals A=B of the digital comparators 133 to 138 are interconnected to an encoder 131 and an OR gate 132. The OR gate 132 makes the signal TST go high when any one of the digital comparators 133 to 138 is high and makes it go low when otherwise. Data Ds outputted by the encoder 131 becomes "0" when all the digital comparators 133 to 138 produce low-level outputs and becomes "1", "2", "3", "4", "5" and "6" when a high level output is produced by the digital comparators 133, 134, 135, 136, 137 and 138, respectively.

The output data Ds of the encoder 131 is routed to the selection control terminal SEL of the multiplexer 121 as shown in FIG. 2B. When "0", "1", "2", "3", "4", "5" or "6" is applied to the terminal SEL, the multiplexer 121 produces on its output terminal OUT a signal which is applied to the input terminal A, B, C, D, E, F or G. Therefore, if any of predicted addresses (data ADg stored in the shift register) coincides with a designated address, data latched in any of the latches (123 to 127) which has latched data associated with that address is fed out to the system bus 2 via the buffer 120.

Figure 2D:
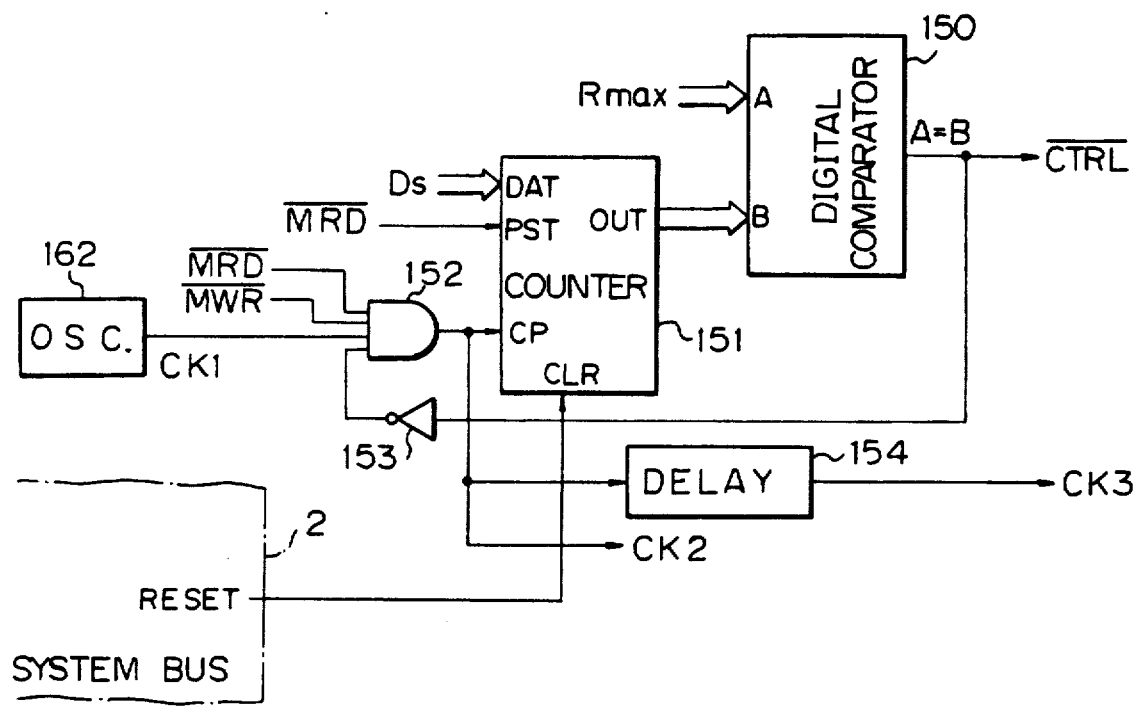

Referring to FIG. 2D, an oscillator 162 oscillates clock pulses CK1 having a predetermined period. A counter 151 has a pulse input terminal CP to which an AND gate 152 is interconnected. The AND gate 152 has four input terminals to which are applied the memory read strobe MRD, memory write strobe MWR, clock CK1, and an output signal of an inverter 153, respectively. In this arrangement, while the system bus 2 does not request a memory access, the clock pulses CK1 are fed to and counted by the counter 151, the count appearing on an output terminal OUT of the counter 151. The counter output terminal OUT is interconnected to an input terminal B of a digital comparator 150. Constantly fed to the other input terminal of the digital comparator 150 is a predetermined fixed value $R_{max}$ ("7" in this particular embodiment). A signal CRTL appearing on an output terminal A=B of the digital comparator 150 goes high when the values on the input terminals A and B are equal and goes low when otherwise. While the signal CTRL is high, one input terminal of the AND gate 152 is made low via the inverter 153 so that the output terminal of the AND gate 152 is kept low. That is, no clock pulse CK1 is supplied to the counter 151 and, hence, the counter 151 is stopped at the value $R_{max}$.

The control signal CTRL is delivered to one input terminal of an AND gate 115 (see FIG. 2A). Applied to the other input terminal of the AND gate 115 is the memory read strobe MRD. An output signal of the AND gate 115 is fed to the read control terminal RD of the memory unit 50. Therefore, when the control signal CTRL is low, i.e., while the counter 151 counts clock pulses CK1, data is read out of the memory unit 50.

As shown in FIG. 2D, the clock pulses CK3 are prepared by slightly delaying the clock pulses CK2 by a delay circuit 154. Hence, while the counter 151 counts clock pulses CK1, i.e., until six clock pulses CK2 at maximum appear, clock pulses (CK3) are fed to the shift register (122 to 127). This shift register latches output data Dout of the memory unit 50 and shifts data already latched therein every time a clock pulse appears so that, when six clock pulses are applied, six data are stored in the shift register (122 to 127). Meanwhile, every time a clock pulse CK2 is generated, the latch 103 generates a new predicted address ADg and delivers it to the memory unit 50 (see FIG. 2A). Therefore, each of the data stored in the shift register (122 to 127) is the data stored in a predicted address. This means that in this particular embodiment data from six predicted addresses at maximum are latched in the shift register (122 to 127) prior to an actual reading operation.

Even before seven clock pulses CK2 are produced, the memory read strobe MRD or the memory write strobe MWR goes low whenever a memory access is requested over the system bus 2. Then, clock pulses CK2 are not produced any longer and the operation of the counter 151 is stopped. A specific example will be described hereinafter.

Assume that a memory read request is applied over the system bus 2 after a predicted data has been read out of the memory unit 50. At this instant, if a predicted address which coincides with a designated address ADRS is present in the latch 143, the output terminal of the digital comparator 137 goes high with the result that the encoder 131 produces "5" as the data Ds. The multiplexer 121, therefore, produces data which is held by the latch 126. Here, the memory access time is very short since the data is read out of a latch. The output data Ds of the encoder 131 is fed to a data terminal DAT of the counter 151 and the memory read strobe MRD to a preset control terminal PST of the same, whereby the counter 151 is preset to "5". As a result, upon completion of the memory access from the system bus 2 the counter 151 starts counting clock pulses CK2 at "5" and ends at "7". In the meantime, two clock pulses CK2 are produced allowing two new data to be read out. After the two consecutive times of predicted data reading, data stored in the latches 122, 123, 124 and 125 are respectively transferred to the latches 124, 125, 126 and 127 while new data are loaded in the latches 123 and 122.

Stated another way, predicted data which precede the data read out of the latch 126 this time are preserved in the shift register. If the prediction proves right, the signal TST becomes high to make the output of the inverter 117 low with the result that the output terminal of the AND gate 116 remains low (see FIG. 2A). Under this condition, the value of the address ADo read last time and usable for the calculation of a predicted address is not updated to the address ADRS designated then and, instead, replaced with one (output of latch 103) of addresses predicted in the past which is of the remotest future. Specifically, assuming that the data stored in the latch 126 is the "n" data, at the instant when the "n" data is read out, the "n+1", "n+2", "n+3" and "n+4" future predicted data are already stored in the latches 125, 124, 123 and 122 and, hence, it is needless to read them out again. What is required is simply generating a predicted address based on the subsequent "n+5" data.

Even though such a control may temporarily shorten the period of memory access over the system bus 2, the data can be outputted only if the predicted data is read out before then. If the prediction is wrong, the encoder 131 produces "0" as the data Ds so that the multiplexer 121 delivers an output data Dout of the memory unit 50 directly to the system bus 2. In this case, the address terminal of the memory unit 50 becomes ADRS. Because the signal TST has been kept low, the multiplexer 101 is caused by an output pulse of the flip-flop 113 to select the then read address (output of latch 105) as the last address adapted for calculation of a predicted address at the timing of memory read completion, the next first predicted address being generated in response to a clock pulse CK2 which appears immediately after the selection. In this manner, when the prediction proves wrong, the last address ADo is updated to the newest one and, then, a prediction procedure is resumed. In this condition, because the output data Ds of the encoder 131 is "0", the counter 151 is preset to "0" so that all the latchs 122 to 127 are cleared.

Figure 2E:
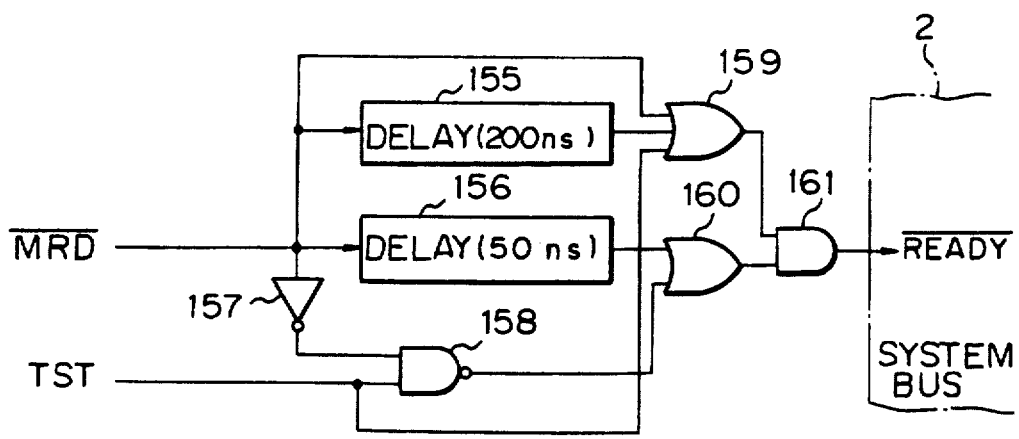

In this particular embodiment, the access time necessary for memory readout as viewed from the system bus side greatly differs from the case wherein the prediction proves right to the case wherein it proves wrong. In light of this, in this embodiment, a synchronizing signal READY is sent to the microprocessor which is interconnected to the system bus 2. A circuitry for generating the signal READY is shown in FIG. 2E. As shown in FIG. 2E, the circuitry comprises delay circuits 155 and 156, an inverter 157, a NAND gate 158, OR gates 159 an 160, and an AND gate 161. These elements cooperate to generate the signal READY based on the control signals TST and MRD.

The delay circuit 155 has a relatively long delay time TL (approximately 200 nanoseconds in this embodiment) while the delay circuit 156 has a relatively short delay time TS (approximately 50 nanoseconds in this embodiment). In this condition, when a prediction is right, the signal READY is produced upon the lapse of 50 nanoseconds since the delivery of a memory read strobe MRD; when it is right, the signal READY is produced upon the lapse of 200 nanoseconds. Therefore, the central processing unit and others which are interconnected to the system bus 2 need only to prolong the time of delivery of a strobe signal RD until a signal READY appears. This allows memory readout to be completed within a short period of time when a prediction is right and, even if a prediction is wrong, within an access time of the same order as a prior art one.

Figure 3:
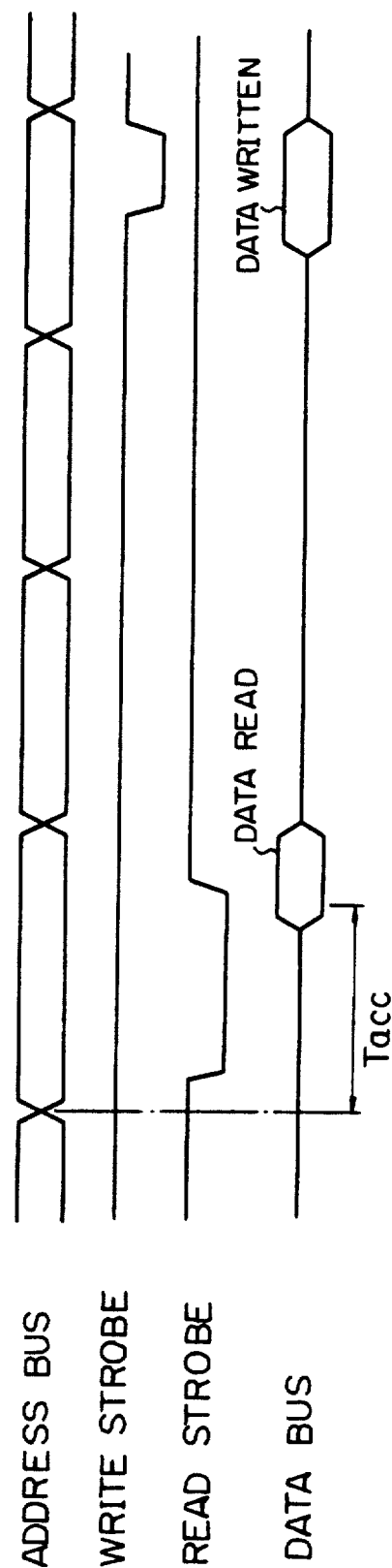
Figure 4B:
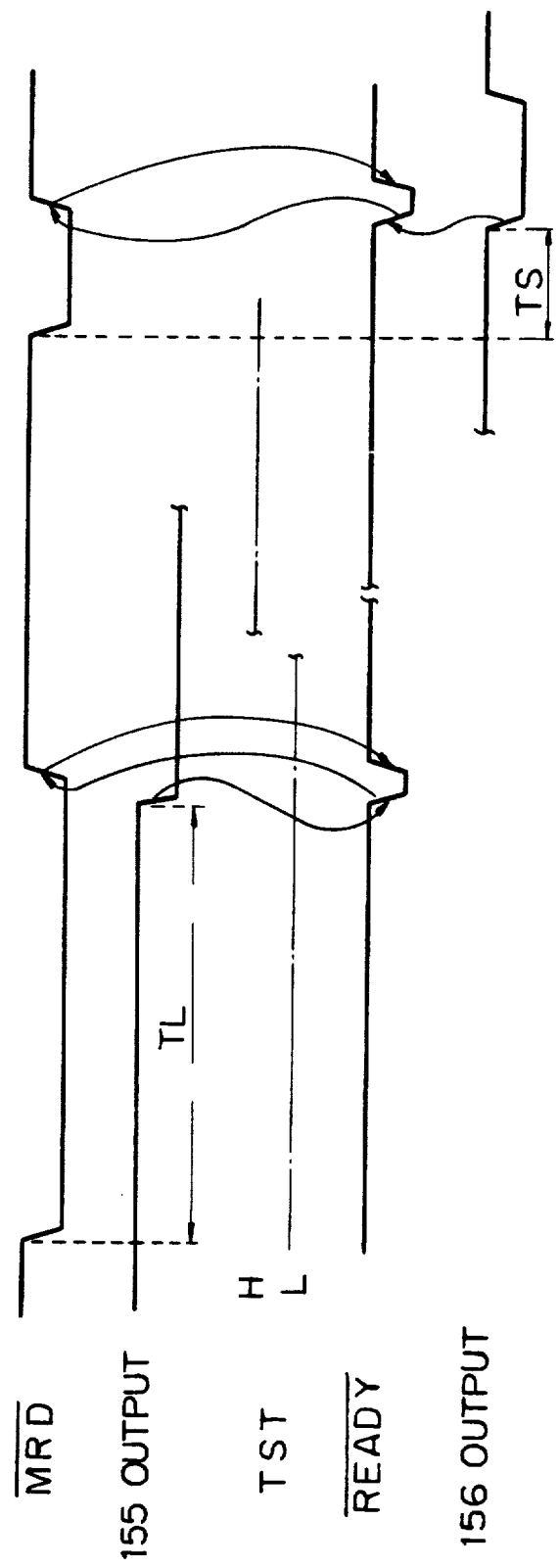

FIGS. 3, 4A and 4B show exemplary timings of the various signals as described above. In FIG. 3, Tacc is representative of the access time.

Figure 5:
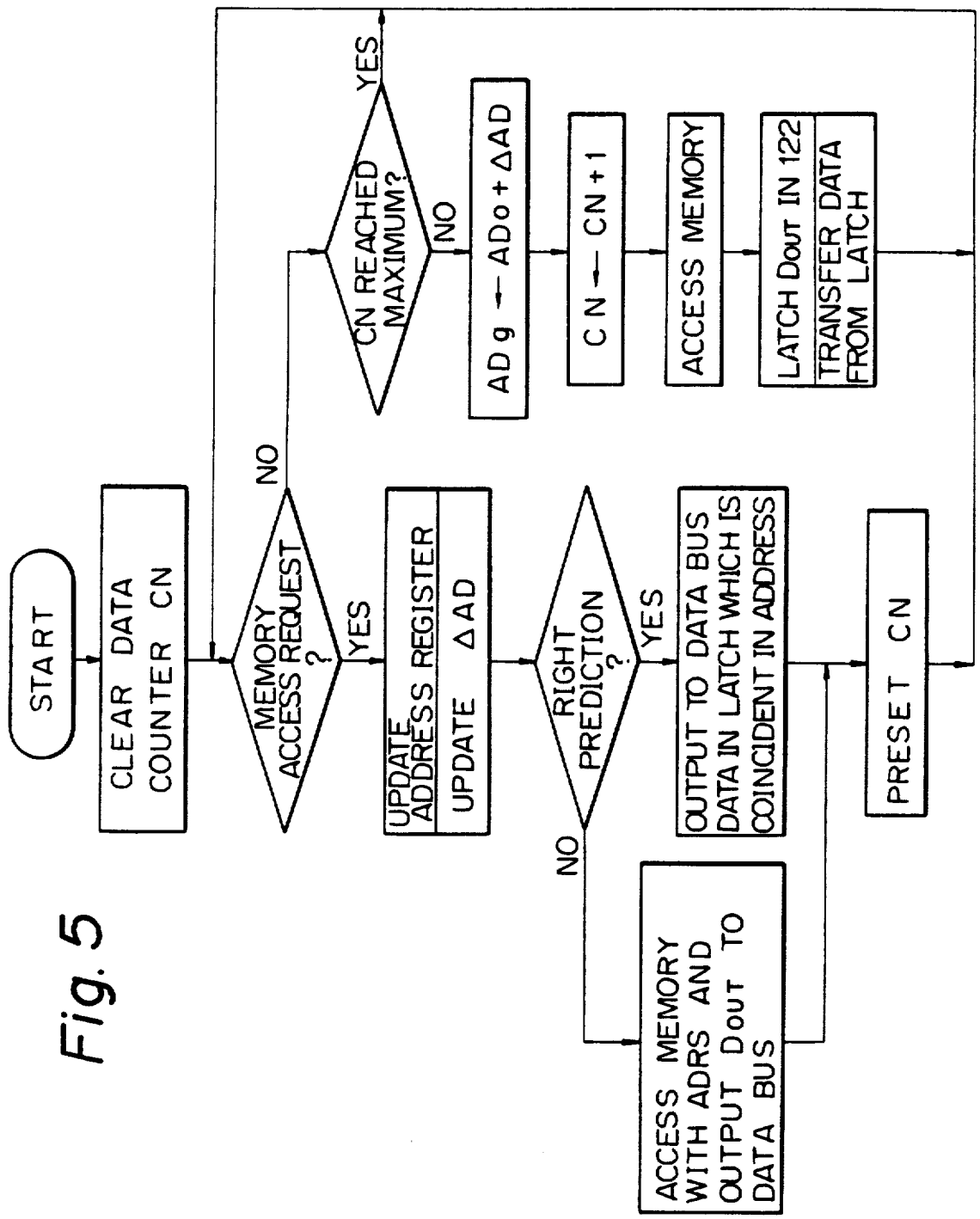
FIG. 5 is a flowchart outlining an operation of the device of FIG. 1.

Referring to FIG. 5, the operation of the storage device 1 is outlined with a part thereof omitted. The operation begins with clearing a data counter CN (corresponding to counter 151 in FIG. 2D) and determining whether or not a memory access request is present. If it is absent, the counter CN is checked. If the counter CN has not been incremented beyond the maximum value, the following operation is performed. Specifically, the amount of updating $\Delta AD$ is added to an address ADo read out last time so as to produce a predicted address ADg. This is followed by incrementing the counter CN by one and accessing a memory based on the predicted address ADg. Data (Dout) read out of the memory is stored in a shift register (122) while data already stored in the shift register are shifted. Such a procedure is repeated until a memory access request arrives or the counter CN exceeds the maximum value. In response to a memory access request, the contents of registers (105 and 106) which hold two latest address values are updated to new ones and, based on the result, the amount of updating $\Delta AD$ is updated also.

Subsequently, the designated address and one or more predicted addresses are compared to see if the prediction is right. If it is right, data read out of the predicted address which coincides with the designated address is read out of the shift register to be fed to the data bus. If the prediction is wrong, the designated address ADRS on the system bus is delivered to the memory to feed data read out of the memory directly to a data bus of the system bus. This is followed by presetting the counter CN based on the position from which the data is read out. Thereafter, the procedure described above is repeated.

While in the embodiment shown and described a memory unit is implemented with a RAM whose access time is approximately 200 nanoseconds, it may be replaced with a memory having a shorter access time or even a memory having a very long access time. In addition, the memory unit is not limited to a semiconductor memory. Naturally, use may be made of a read only memory (ROM).

In summary, it will be seen that the present invention, by use of a memory unit whose access time is relatively long, allows data to be read out within a far shorter period of time than the access time of the memory unit. This remakably cuts down the cost of a storage device.

Various modifications will become possible for those skilled in the art after receiving the teachings of the present disclosure without departing from the scope thereof.

What is claimed is:

1. A storage device having an incoming address bus for receiving incoming memory address signals, and an outgoing data bus, said storage device comprising:

memory means including a plurality of addressable locations, each of said locations for storing a piece of data;

a plurality of registers for temporarily holding data read out of said locations of said memory means;

address-reading means for sequentially reading incoming memory address signals appearing on the address bus, said incoming memory address signals representing actual addresses in said memory means;

address-predicting means for comparing a current one of said incoming memory address signal with a prior one of said sequentially read incoming address signals in a predetermined manner and producing a future memory address prediction based on said comparison;

pre-read control means, operative absent a memory read command, for generating a pre-read control signal;

data reading means, responsive to said pre-read control signal, for reading data out of a certain of said addressable locations and storing said data in said registers, said data reading means further comprising a quantity of address latch means, the quantity being the same as the quantity of said registers, each address latch means adapted for storing a future memory address which identifies an address of data stored in a corresponding one of said registers;

read control means for determining if any of said incoming read addresses coincide with an address corresponding to data stored in one of said registers; and delivering means, responsive to said memory read command, for delivering data from said registers to said outgoing data bus when any of said incoming addresses is the same as the address identifying said data stores in said registers, and for delivering data from said locations of said memory means when any of said incoming addresses are not the same as the address identifying said data stored in said registers.

2. A storage device as claimed in claim 1, wherein said address-predicting means comprises:

first latch means for temporarily storing a memory address signal appearing on said address bus when a memory read command is present, said first latch means subsequently shifting said temporarily stored memory address signal out of said first latch means to make room for temporary storage of a new memory address signal when a subsequent memory read command is present;

second latch means for temporarily storing the output of said first latch means when said subsequent memory read command is present;

first calculating means for producing signals representative of a difference between the outputs of said first and second latch means; and second calculating means, responsive to signals output by said first latch means and said first calculating means, for generating said future memory address prediction.

3. A storage device as claimed in claim 2, wherein said pre-read control means comprises:

a clock providing clock pulses;

a counter providing a counter output signal, said counter being advanced from a value corresponding to a match between any of said read memory addresses with any of the addresses identifying data in the presence of said memory read command; and comparator means for enabling storage of data from said memory means in said registers until said counter output signal, in response to said clock pulses, is incremented to a predetermined value.

4. A storage device as claimed in claim 1, wherein said pre-read control means comprises:

a clock providing clock pulses;

a counter providing a counter output signal, said counter being advanced from a value corresponding to a match between any of said read memory addresses with any of the addresses identifying data in the presence of said memory read command; and comparator means for enabling storage of data from said memory means in said registers until said counter output signal, in response to said clock pulses, is incremented to a predetermined value.

5. A storage device having an incoming address bus for receiving incoming memory address signals, and an outgoing data bus, said storage device comprising:

memory means including a plurality of addressable locations, each of said locations for storing a piece of data;

a plurality of registers for temporarily holding data read out of said locations of said memory means;

address-reading means for sequentially reading incoming memory address signals appearing on the address bus, said incoming memory address signals representing actual addresses in said memory means;

address-predicting means for comparing a current one of said incoming memory address signal with a prior one of said sequentially read incoming address signals in a predetermined manner and producing a future memory address prediction based on said comparison, wherein said address-predicting means comprises:

(a) first latch means for temporarily storing a memory address signal appearing on said address bus when a memory read command is present, said first latch means subsequently shifting said temporarily stored memory address signal out of said first latch means to make room for temporary storage of a new memory address signal when a subsequent memory read command is present;

(b) second latch means for temporarily storing the output of said first latch means when said subsequent memory read command is present;

(c) first calculating means for producing signals representative of a difference between the outputs of said first and second latch means; and (d) second calculating means, responsive to signals output by said first latch means and said first calculating means, for generating said future memory address prediction;

pre-read control means, operative absent a memory read command, for generating a pre-read control signal;

data reading means, responsive to said pre-read control signal, for reading data out of a certain of said addressable locations and storing said data in said registers;

read control means for determining if any of said incoming read addresses coincide with an address corresponding to data stored in one of said registers; and delivering means, responsive to said memory read command, for delivering data from said registers to said outgoing data bus when any of said incoming addresses is the same as the address identifying said data stores in said registers, and for delivering data from said locations of said memory means when any of said incoming addresses are not the same as the address identifying said data stored in said registers.

6. A storage device as claimed in claim 5, wherein said data reading means comprises a same number of address latch means as said registers, and said data reading means stores in each of said address latch means a future memory address which identifies an address of data stored in a corresponding one of said registers.

7. A storage device as claimed in claim 6, wherein said pre-read control means comprises:

a clock providing clock pulses;

a counter providing a counter output signal, said counter being advanced from a value corresponding to a match between any of said read memory addresses with any of the addresses identifying data in the presence of said memory read command; and comparator means for enabling storage of data from said memory means in said registers until said counter output signal, in response to said clock pulses, is incremented to a predetermined value.

8. A storage device as claimed in claim 5, wherein said pre-read control means comprises:

a clock providing clock pulses;

a counter providing a counter output signal, said counter being advanced from a value corresponding to a match between any of said read memory addresses with any of the addresses identifying data in the presence of said memory read command; and comparator means for enabling storage of data from said memory means in said registers until said counter output signal, in response to said clock pulses, is incremented to a predetermined value.

9. A storage device as claimed in claim 5, wherein said second calculating means comprises a two-input adder.

* * * * *